United States Patent
Kao

(10) Patent No.: US 10,158,966 B2
(45) Date of Patent: Dec. 18, 2018

(54) CONNECTED CAR DATA LINKS AGGREGATOR

(71) Applicant: AT&T Intellectual Property I, L.P., Atlanta, GA (US)

(72) Inventor: Frank Kao, Palo Alto, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 383 days.

(21) Appl. No.: 14/534,137

(22) Filed: Nov. 5, 2014

(65) Prior Publication Data

US 2016/0127850 A1    May 5, 2016

(51) Int. Cl.
*H04W 4/00*    (2018.01)
*H04W 84/00*   (2009.01)
(Continued)

(52) U.S. Cl.
CPC ............ *H04W 4/005* (2013.01); *H04W 4/70* (2018.02); *H04W 40/32* (2013.01); *H04W 84/005* (2013.01); *H04W 88/08* (2013.01)

(58) Field of Classification Search
CPC ............................. H04W 4/005; H04W 40/32
See application file for complete search history.

(56) References Cited

U.S. PATENT DOCUMENTS

| 4,942,571 A | 7/1990 | Moller et al. |
| 6,507,810 B2 | 1/2003 | Razavi et al. |

(Continued)

FOREIGN PATENT DOCUMENTS

| CA | 2788628 A1 | 2/2014 |
| DE | 102012025035 A1 | 6/2014 |

(Continued)

OTHER PUBLICATIONS

"What is MirrorLink? Connect and ride," mirrorlink.com, Car Connectivity Consortium. Published online at [http://www.mirrorlink.com/about-mirrorlink], retrieved on Aug. 15, 2014, 1 page.

(Continued)

*Primary Examiner* — Walter J Divito
*Assistant Examiner* — Anthony Luo
(74) *Attorney, Agent, or Firm* — Amin, Turocy & Watson, LLP

(57) ABSTRACT

Connected cars are coupled to several communication devices (e.g., embedded devices and/or user equipment (UE) of occupants of the car) having independent data links to a communication network (e.g., cellular network). Peer-to-peer (P2P) protocols can be employed to consolidate and aggregate multiple data links within the car to create an aggregated data link that is shared by the devices. During initialization, a local platform device within the connected car sets up a local tracker and communicates with a backend network device to setup a corresponding remote tracker. The trackers generate virtual data nodes corresponding to the communication devices and facilitate communication between the virtual data nodes and the devices via P2P protocols. Moreover, the P2P protocol technology is overlaid on the application layers of the communication devices without modifications to the devices' hardware and software construction.

20 Claims, 12 Drawing Sheets

(51) Int. Cl.
*H04W 40/32* (2009.01)
*H04W 4/70* (2018.01)
*H04W 88/08* (2009.01)

(56) References Cited

U.S. PATENT DOCUMENTS

| | | | |
|---|---|---|---|
| 7,484,008 B1 | 1/2009 | Gelvin et al. | |
| 7,644,171 B2 | 1/2010 | Sturniolo et al. | |
| 7,891,004 B1 | 2/2011 | Gelvinc et al. | |
| 8,458,353 B2 | 6/2013 | Krishnaswamy et al. | |
| 8,707,044 B2 | 4/2014 | Shim et al. | |
| 8,750,306 B2 | 6/2014 | Yousefi et al. | |
| 8,797,953 B2 | 8/2014 | Kaliyaperumal et al. | |
| 9,444,887 B2 * | 9/2016 | Huang | H04L 45/64 |
| 2008/0227434 A1 | 9/2008 | Nitta et al. | |
| 2009/0318147 A1 * | 12/2009 | Zhang | H04W 8/26 |
| | | | 455/435.1 |
| 2012/0087303 A1 * | 4/2012 | Kwon | H04W 48/10 |
| | | | 370/328 |
| 2013/0083722 A1 * | 4/2013 | Bhargava | H04W 72/085 |
| | | | 370/315 |
| 2013/0318339 A1 * | 11/2013 | Tola | H04L 63/0478 |
| | | | 713/150 |
| 2014/0114497 A1 | 4/2014 | Miyake | |
| 2014/0207338 A1 * | 7/2014 | Healey | G06F 7/00 |
| | | | 701/45 |
| 2015/0282245 A1 * | 10/2015 | Scheim | H04W 48/10 |
| | | | 455/418 |

FOREIGN PATENT DOCUMENTS

| | | |
|---|---|---|
| EP | 1886214 B1 | 8/2014 |
| JP | 2014505448 A | 2/2014 |
| WO | 0225968 A1 | 3/2002 |
| WO | 2013126852 A2 | 8/2013 |

OTHER PUBLICATIONS

"Automotive Grade Connectivity Products," go-huml.com, HUML GmbH and Co. KG, Germany. Published online at [http://www.go-huml.com/products.html], retrieved on Aug. 15, 2014, 2 pages.

"AppRadio with Large 7-Inch Multi-Touch Screen with GPS, Bluetooth, Android, iPhone 5 and MirrorLink Compatibility," SPH-DA110, pioneer.eu. Published online at [http://www.pioneer.eu/eur/products/25/299/35829/SPH-DA110/page.html], retrieved on Aug. 15, 2014, 3 pages.

* cited by examiner

CONNECTED CAR DATA LINKS AGGREGATOR

TECHNICAL FIELD

The subject disclosure relates to wireless communications, e.g., to a connected car data links aggregator.

BACKGROUND

With a rapid increase in wireless network resources, automobile manufacturers are working towards a connected car that takes advantage of high network data speeds to provide users with various services, such as, voice-controlled applications, infotainment, and/or diagnostics. Connected cars can be coupled to the Internet via network devices of most any communication network (e.g., cellular network, WiFi network, satellite communication network, etc.). Further, connected cars can be directly coupled to each other via Bluetooth® or most any other peer-to-peer communication technology.

Connected cars can include various communication devices, such as, devices embedded within the car and/or user equipment of the driver and/or passengers within the car. These devices have substantial computing power and independent communication (wireless) data links that couple the respective devices to the communication network. Utilizing only one of the independent wireless data links for communication between a device and the communication network can limit performance of applications, especially, data-intensive applications.

DETAILED DESCRIPTION

Figure 1:
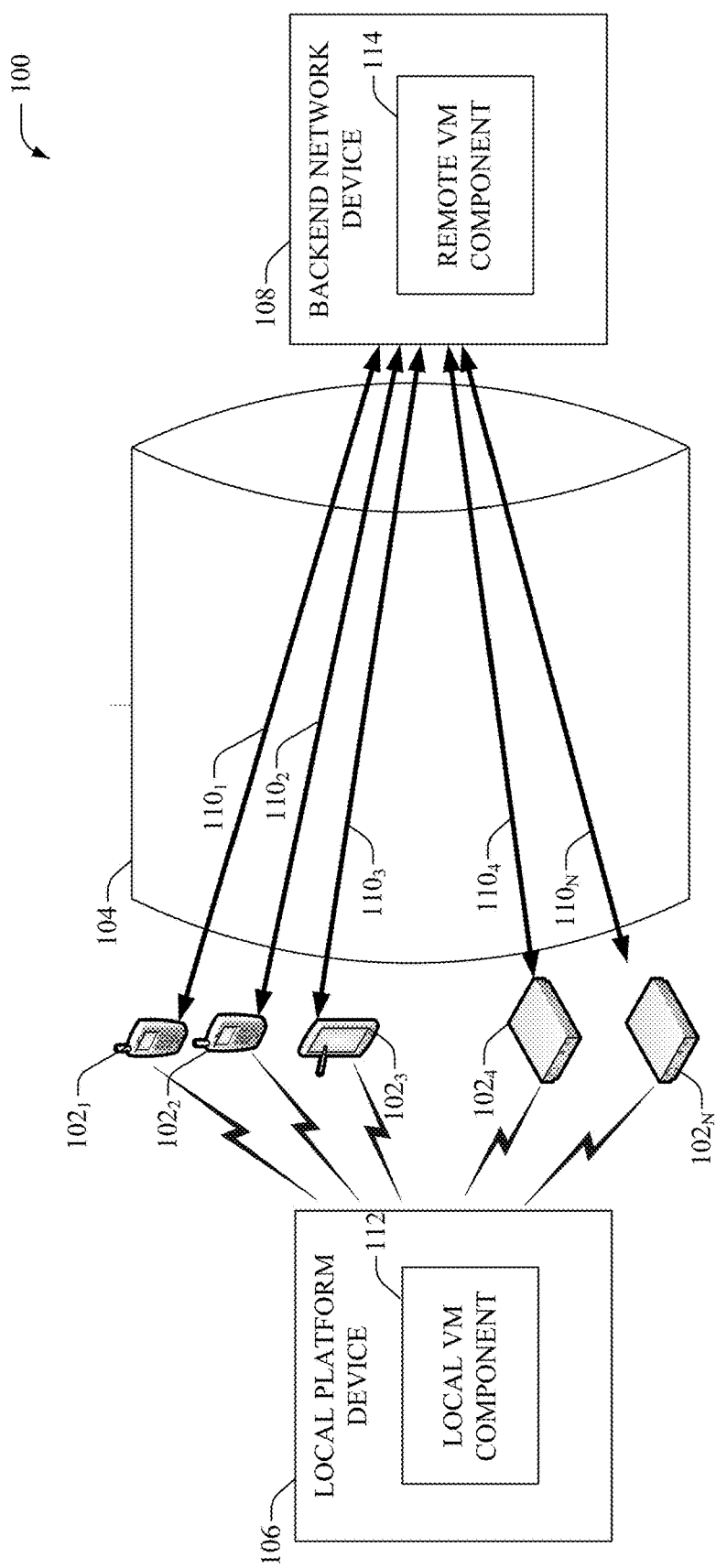
FIG. 1 illustrates an example system that facilitates data link aggregation in connected vehicles.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology, Fifth generation (5G), etc. Additionally, substantially all aspects of the disclosed subject matter can be exploited in legacy (e.g., wireline) telecommunication technologies.

Furthermore, the terms "user," "subscriber," "consumer," "driver," "occupant," "passenger," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Connected cars comprise several devices (e.g., embedded devices and/or user equipment (UE) of occupants of the car) that provide a large amount of computing power and multiple wireless communication links to a communication network (e.g., cellular network). Bundling of these links can be performed in the radio access network (RAN) and device level. Systems and methods disclosed herein relate to utilizing peer-to-peer (P2P) protocols to consolidate and aggregate the multiple wireless communication links within the car to create an aggregated data link (bigger than any of the individual wireless communication links) that is available for each of the UEs. the systems and methods described herein can be applied to aggregating various disparate communication links within a local ecosystem, and not limited to connected car environment.

Referring initially to FIG. 1, there illustrated is an example system 100 that facilitates data link aggregation in connected vehicles, according to one or more aspects of the disclosed subject matter. System 100 implements a logical peer-to-peer (P2P) network that aggregates the wireless data channels from multiple user equipment (UEs) $1021$-$102_N$ (where N is most any positive integer greater than 1) into a single big and faster data pipe 104 that can be shared by the UEs $102_1$-$102_N$. Moreover, P2P protocol technology is overlaid on top of the application layers of the user equipment without modifications to any of the user equipment's hardware and/or software construction.

System 100 can comprise a local platform device 106 that can manage and control the P2P network communication. As an example, the local platform device 106 can be part of, reside within, and/or be coupled to a connected vehicle. Moreover, the connected vehicle can be coupled to network devices, e.g., backend network device 108, of most any communication network (e.g., cellular network, WiFi network, satellite communication network, etc.) and/or can be directly coupled to other connected vehicles (not shown) via Bluetooth® or most any other P2P communication technology. Further, based on communication with the network devices and/or other connected vehicles, the connected vehicle can provide various services (e.g., diagnostic, infotainment, navigation/routing, weather/news, etc.) to devices within (and/or coupled to) the connected vehicle. In one example, the connected vehicle can include a subscriber identity module (SIM) and a radio (e.g., a cellular radio, satellite radio, etc.) to facilitate communication with the communication network. According to an aspect, system 100 enables a UE (e.g., $102_1$-$102_N$) to leverage bandwidth and/or resources of other devices (e.g., $102_1$-$102_N$) within (or coupled to) the connected vehicle to improve quality of service and/or user experience.

Typically, multiple UEs (e.g., $102_1$-$102_N$) can be located within (or be coupled to) the connected vehicle. As an example, the UEs (e.g., $102_1$-$102_3$) can include most any electronic communication devices such as, but not limited to, most any consumer electronic device, for example, a tablet computer, a digital media player, a digital camera, a cellular phone, a personal computer, a personal digital assistant (PDA), a smart phone, a laptop, a wearable device (e.g., smart watch, connected glasses, wrist monitor, etc.), a gaming system, etc. Further, the UEs (e.g., $102_4$-$102_N$) can also include, most any device embedded within and/or part of the vehicle that includes a communication radio. It is noted that UEs $102_1$-$102_N$ can be mobile, have limited mobility and/or be stationary. UEs $102_1$-$102_N$ can establish respective communication links $110_1$-$110_N$ with a network device, for example, the backend network device 108 of a cellular network (e.g., via one or more radio access networks (RANs)). In one aspect, these communication links $110_1$-$110_N$ can be aggregated and/or shared by the UEs $102_1$-$102_N$ to generate an aggregated data link 104 that has a larger bandwidth and faster communication speeds than that of the individual communication links $110_1$-$110_N$. Typically, the aggregated data link 104 provides faster and more efficient communication that improves quality of service (QoS), especially for high-demand, real-time, and/or data-intensive applications of UEs $102_1$-$102_N$. Additionally or alternatively, the aggregated data link 104 can also be utilized when the individual communication links $110_1$-$110_N$ are disconnected, interrupted, and/or have poor efficiency/QoS/signal strength.

According to an embodiment, during initialization of a P2P network, the local platform device 106 sets up a local virtual machine (VM) component 112 and communicates with the backend network device 108 to set up a corresponding remote VM component 114. The components 112 and 114 comprise trackers that generate virtual data nodes corresponding to the UEs $102_1$-$102_N$ and facilitate communication between the virtual data nodes and UEs $102_1$-$102_N$ via P2P protocols. It is to be noted that the components 112 and 114 setup a logical P2P network across a receiving and transmitting end of an application layer associated with UEs $102_1$-$102_N$. Although, the systems and methods disclosed herein are described with reference to a local platform device 106 within a connected vehicle, it is noted that the subject specification is not limited to connected vehicles and can be implemented/utilized in various applications. For example, the local platform device 106 can be part of a local ecosystem that can aggregate different communication links (e.g., wired and/or wireless) to generate a larger data pipe that can be shared by different devices of the local ecosystem. In one aspect, a device of the local ecosystem can leverage higher bandwidths, throughput and/or performance associated with data transfer by utilizing the shared data pipe. Additionally or alternatively, the device can utilize the shared data pipe to facilitate communication when its individual link to the communication network has been interrupted, disconnected, has poor data transfer characteristics, etc.

Figure 2:
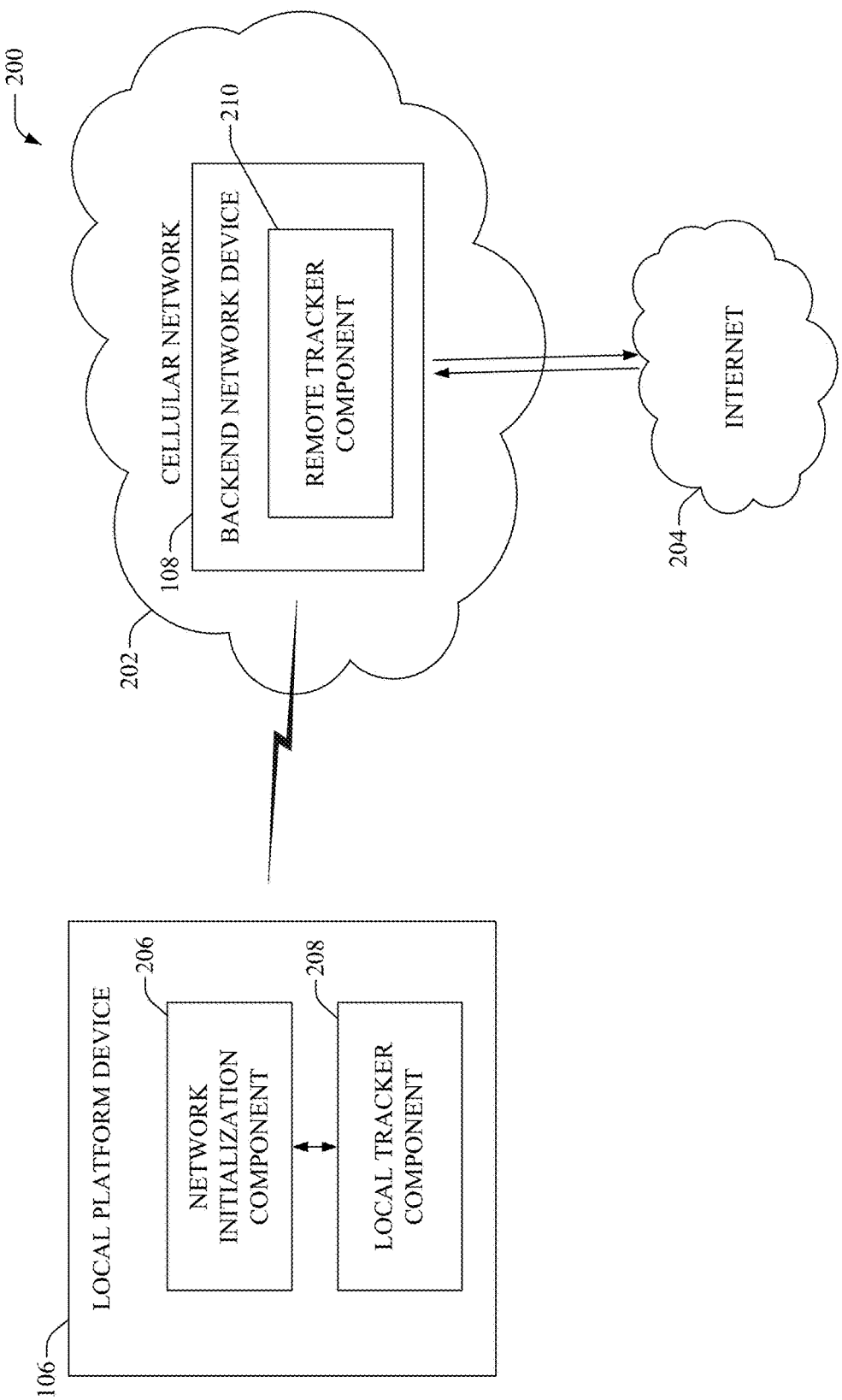
FIG. 2 illustrates an example system for initializing a logical peer-to-peer (P2P) network, according to an aspect of the subject disclosure.

Referring now to FIG. 2, there illustrated is an example system 200 for initializing a logical P2P network, in accordance with an aspect of the subject disclosure. In one aspect, system 200 facilitates setup of a P2P network over an application layer that couples devices registered with a local platform device 106 to a cellular network and/or a wide area network, for example, the Internet 204. In one example, the local platform device 106 can reside within and/or be part of a connected vehicle. The local platform device 106 can include (or be coupled to) a SIM that facilitates authentication with the cellular network 202. Once authentication is successful, the local platform device 106 can communicate with network devices (e.g., backend network device 108) of the cellular network 202 via most any RAN(s) (not shown). It is noted that the local platform device 106 and the backend network device 108 can include functionality as more fully described herein, for example, as described above with regard to system 100.

In one aspect, the local platform device 106 can include a network initialization component 206 that initiates a setup of the logical P2P network. As an example, the network initialization component 206 can initiate the setup when the local platform device 106 is activated, when one or more devices have registered with the local platform device 106, on demand, and/or at most any time, for example, specified by a network operator and/or user policy. Moreover, the network initialization component 206 can setup trackers on both ends of the pipe. For example, a local tracker component 208 can be setup within the local platform device 106 and a remote tracker component 210 can be setup within the backend network device 108. The trackers (e.g., local tracker component 208 and the remote tracker component 210) can centrally coordinate the P2P transfer of data between devices coupled to the local platform device 106 and the Internet 204 (and/or cellular network devices). The trackers (e.g., local tracker component 208 and the remote tracker component 210) receive peer reports from the devices that specify resources (e.g., bandwidth, channel quality, signal strength, etc.) available to the devices that are analyzed to facilitate P2P routing. In one aspect, local tracker component 208 and the remote tracker component 210 are assigned as super nodes to each other. Super nodes can have a large number of data links, fast network connections, high bandwidth and quick processing capabilities. In this example scenario, the assignment of two nodes as each others super nodes can enable the nodes to transfer a maximum and/or a large portion of communication data to their super node. Moreover, the local tracker component 208 and the remote tracker component 210 can serve as relay devices and/or proxy servers that manage data flows and connections for the devices within the vehicle. The local tracker component 208 and the remote tracker component 210 can communicate using most any wireless communication protocols. As an example, the local tracker component 208 and the remote tracker component 210 can utilize heartbeat messaging to communicate with each other (e.g., during synchronization). In one aspect, the remote tracker component 210 can instantiate virtual machines (VMs) that can host all data requests from/to devices tracked by the local tracker component 208. Accordingly, system 200 can initialize a P2P architecture that is superimposed on top of the heterogeneous network links associated with devices registered with the local platform device 106.

Figure 3:
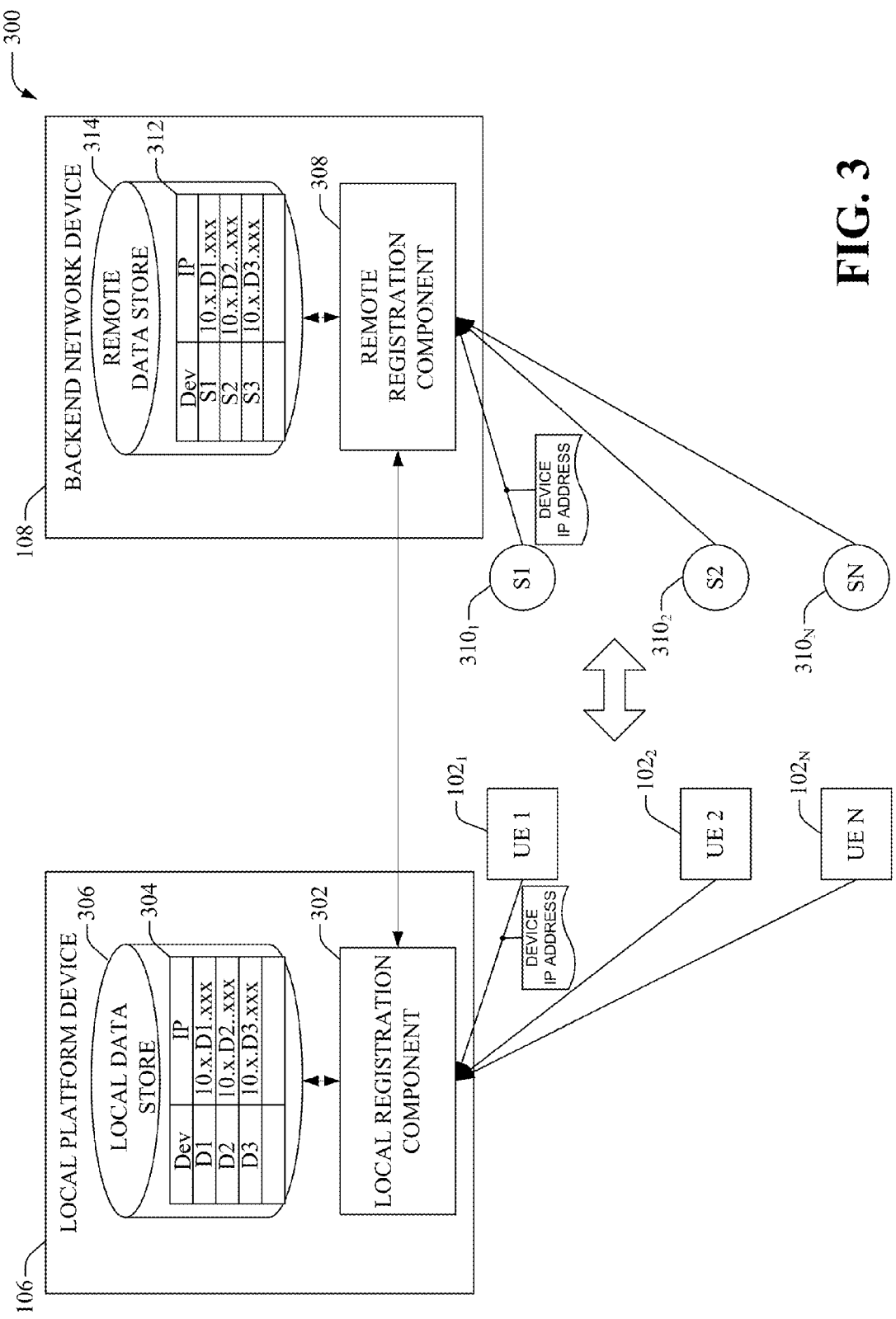
FIG. 3 illustrates is an example system that facilitates registration of user equipment (UE) with a local platform device.

Referring now to FIG. 3, there illustrated is an example system 300 that facilitates registration of user equipment with a local platform device, according to an aspect of the subject disclosure. It is noted that the UEs $102_1$-$102_N$, local platform device 106, and the backend network device 108 can include functionality as more fully described herein, for example, as described above with regard to systems 100 and 200.

In an aspect, UEs $102_1$-$102_N$ can include an application that scans for the local platform device 106 and requests registration on detection of the local platform device 106. As an example, when UE $102_1$ enters the connected vehicle, the UE $102_1$ can detect the local platform device 106 and initiate the registration process. In another example, devices (e.g., UEs $102_1$-$102_N$) embedded within the connected vehicle can initiate the registration process when switched on, activated, on demand, and/or at most any time. A local registration component 302 of the local platform device 106 can receive the registration request from a device, for example, UE $102_1$. The registration request can include device identifier data, such as, but not limited to, an internet protocol (IP) address of the UE $102_1$ The local registration component 302 can store the device identifier data, for example, in a table 304 within a local data store 306.

Further, the local registration component 302 can communicate with a remote registration component 308 of the backend network device 108 to indicate the registration of the UE $102_1$. As an example, the local registration component 302 can transmit device identifier data (e.g., IP address) of UE $102_1$ to the remote registration component 308. The remote registration component 308 can instantiate a shadow VM, S1 $310_1$, corresponding to the physical device, UE $102_1$, by employing one or more proxy servers. As an example, a shadow node can be a virtual node representing a physical device. The remote registration component 308 can store the device identifier data (e.g., IP address) associated with the shadow VM S1 $310_1$, for example, in a table 312 of a remote data store 314. In addition, remote registration component 308 can configure messaging associated with S1 $310_1$ to limit communications of S1 $310_1$ to specific devices. Moreover, device identifier data (e.g., IP address) associated with the devices that S1 $310_1$ is authorized to communicate with can be sent to S1 $310_1$. For example, S1 $310_1$ can be authorized to communicate only with its corresponding physical device, UE $102_1$, and the backend network device 108. Moreover, the remote registration component 308 can assign UE $102_1$ as a super node for S1 $310_1$.

After instantiation and/or configuration of S1 $310_1$, the remote registration component 308 can send an acknowledgement message to the local registration component 302 indicating that the remote registration has been completed. The acknowledgement message can also include device identifier data (e.g., IP address) associated with S1 $310_1$. The local registration component 302 can utilize this device identifier data to configure communications of UE $102_1$. For example, device identifier data associated with S1 $310_1$ and the local platform device 106 can be sent to the UE $102_1$ to authorize the UE $102_1$ to communicate only with its corresponding shadow VM, S1 $310_1$, and the local platform device 106. Additionally, the local registration component 302 can assign S1 $310_1$ as a super node for UE $102_1$. Similarly, the local registration component 302 and the remote registration component 308 can perform registration for UEs $102_2$-$102_N$ by creating and configuring corresponding shadow VMs $310_2$-$310_N$.

In one aspect, the local registration component 302 can initiate and perform a deregistration process, for example, when a device (e.g., UE $102_1$) is no longer coupled to the local registration component 302, has been switched off/deactivated, has exited the vehicle, has requested to be deregistered, etc. During the deregistration process, the local registration component 302 can delete the device identifier information associated with the device from the table 304 of local data store 306 and send a deregistration request to the remote registration component 308. In response, the remote registration component 308 can uninstantiate the corresponding shadow VM (e.g., S1 $310_1$) and remove the device identifier data associated with the shadow VM (e.g., S1 $310_1$) from the table 312 of remote data store 314. It is noted that the data stores 306 and 314 can include volatile memory(s) or nonvolatile memory(s), or can include both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory. Further, although depicted as residing completely within the local platform device 106 and the backend network device 108 respectively, it is noted that the data stores 306 and 314 can partially reside within the local platform device 106 and the backend network device 108 respectively and/or be locally (or remotely) coupled to the local platform device 106 and the backend network device 108 respectively.

Figure 4:
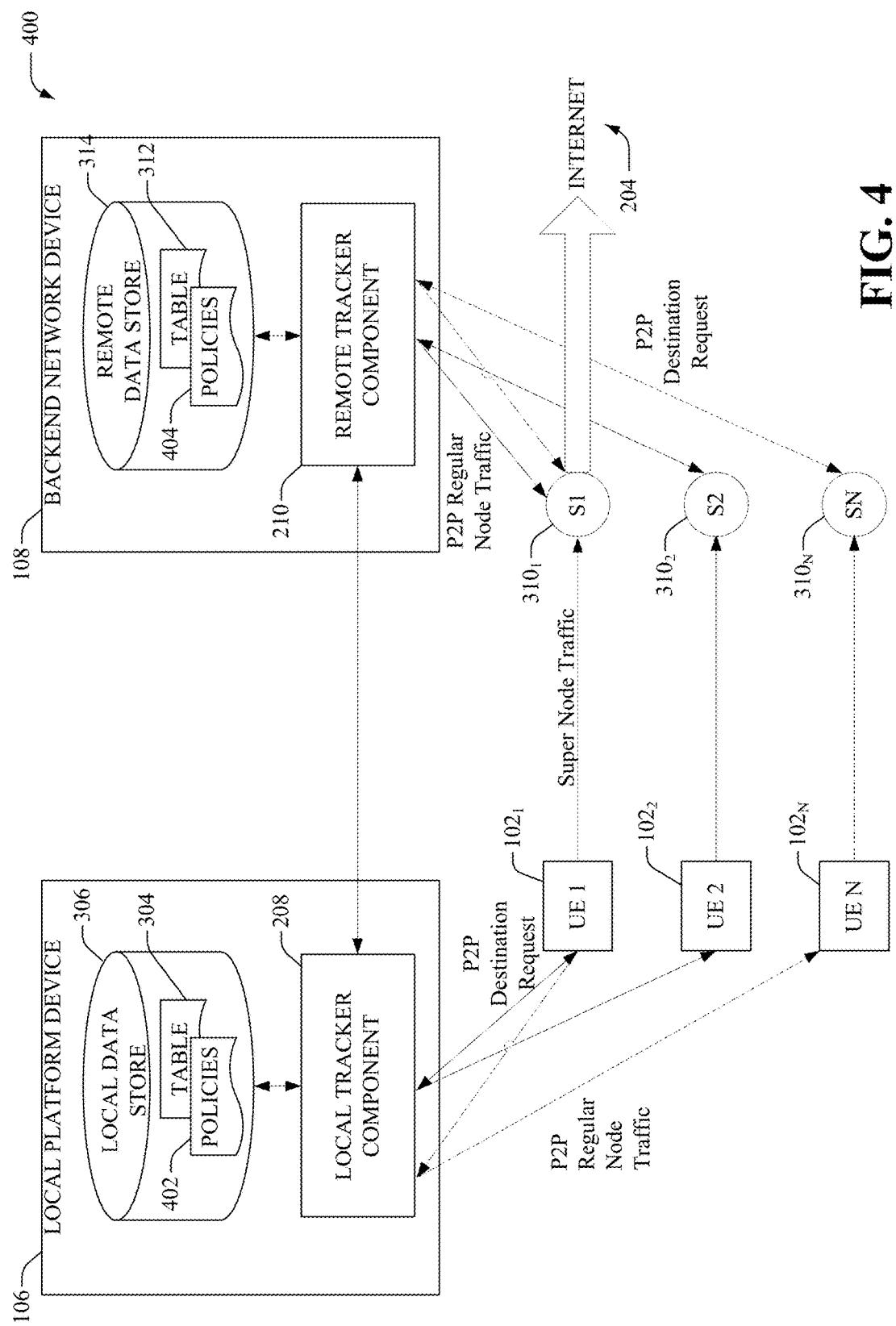
FIG. 4 illustrates an example system that facilitates a transmission of data from a UE via a P2P overlay network.

FIG. 4 illustrates an example system 400 that facilitates a transmission of data from a UE via a P2P overlay network, according to an aspect of the disclosed subject matter. Resources (e.g., data transmission resources) of UEs $102_1$-$102_N$ can be aggregated and shared by the individual UEs $102_1$-$102_N$ to facilitate faster and/or more efficient communication between the UEs $102_1$-$102_N$ and Internet devices. It can be noted that the UEs $102_1$-$102_N$, local platform device 106, the backend network device 108, local tracker component 208, remote tracker component 210, tables 304 and 312, local data store 306, shadow VMs S1-SN $310_1$-$310_N$, and remote data store 314 can include functionality as more fully described herein, for example, as described above with regard to systems 100-300.

In one aspect, UEs $102_1$-$102_N$ can be registered with the local platform device 106 (e.g., by employing local registration component 302) and during the registration, shadow VMs, S1-SN $310_1$-$310_N$, can be instantiated (e.g., by employing remote registration component 308) for the UEs $102_1$-$102_N$ respectively. The UEs $102_1$-$102_N$ and their corresponding shadow VMs, S1-SN $310_1$-$310_N$, are designated as super nodes for each other. Moreover, the UEs $102_1$-$102_N$ are restricted to communicate with their corresponding super nodes and the local tracker component 208. As an example, this routing data can be provided by the local tracker component 208 to the UEs $102_1$-$102_N$ and stored within a memory of the UEs $102_1$-$102_N$, for example, during registration, periodically, at a specified time, on-demand, in response to detecting an event, etc. Similarly, S1-SN $310_1$-$310_N$ are restricted to communicate with their corresponding super nodes and the remote tracker component 210. As an example, this routing data can be provided by the remote tracker component 210 to S1-SN $310_1$-$310_N$ and stored within a memory of S1-SN $310_1$-$310_N$, for example, during registration, periodically, at a specified time, on-demand, in response to detecting an event, etc. Table 1 depicts example routing information transmitted to and stored within UE $102_1$ and Table 2 depicts example routing information transmitted to and stored within S1 $310_1$.

TABLE 1

| DEVICE | IP ADDRESS |
|---|---|
| Local Tracker | 10.x.T.xxx |
| S1 ($310_1$) | Local link (e.g., $110_1$) |

TABLE 2

| DEVICE | IP ADDRESS |
|---|---|
| Remote Tracker | 10.x.T.xxx |
| UE 1 ($102_1$) | Local link (e.g., $110_1$) |

According to an aspect, UE $102_1$ can leverage transmission resources (e.g., wireless links $110_2$-$110_N$) of peer devices (e.g., UEs $102_2$-$102_N$) to transmit communication data (e.g., data packets associated with voice/video calls, text messages, application data, etc.) to target devices via the Internet 204. Most of the communication data can be sent by UE $102_1$ through its designated Super Node S1 $310_1$ (e.g., via wireless communication link $110_1$). The UE $102_1$ can then transmit a P2P destination request to the local tracker component 208 for information regarding destination device(s) through which the remainder of the communication data can be transmitted. As an example, the division of the communication data into portions that are routed via different devices can be determined based on predefined network/user policies. Based on data stored in the local data store 306 (e.g., table 304 and/or network/user policies 402), the local tracker component 208 can provide the UE $102_1$ with device identifier information (e.g., IP address) of the destination device(s), such as but not limited to, UEs $102_2$-$102_N$. Accordingly, UE $102_1$ can transmit the remainder of the communication data to UE $102_2$ and/or UE $102_N$. In one example, the UE $102_1$ can transmit the remainder of the communication data to UEs $102_2$-$102_N$ via the local tracker component 208 (as depicted in FIG. 4) and/or can directly transmit the remainder of the communication data to UEs $102_2$-$102_N$ via P2P links between UE $102_1$ and the respective UEs $102_2$-$102_N$. On receiving the remainder of the communication data, UEs $102_2$-$102_N$ can transfer the communication data to their respective super nodes S2-SN $310_2$-$310_N$, for example, via wireless communication links $110_2$-$110_N$.

Based on the routing data, S2-SN $310_2$-$310_N$ can send a P2P destination request to the remote tracker component 210 to request for a destination VM. The remote tracker component 210 can provide S2-SN $310_2$-$310_N$ data corresponding to the VM (e.g., S1 $310_1$) associated with the source device (e.g., UE $102_1$) of the communication data. As an example, the remote tracker component 210 can determine the VM (e.g., S1 $310_1$) based on data (e.g., table 314 and/or network/user policies 404) stored with the remote data store 314. Accordingly, S2-SN $310_2$-$310_N$ can send the received data to S1 $310_1$, for example, via the remote tracker component 210 (as depicted in FIG. 4) and/or directly via P2P links between S2-SN $310_2$-$310_N$ and S1 $310_1$. In one aspect, S1 $310_1$ can aggregate and/or assemble the data packets received via UE $102_1$ and S2-SN $310_2$-$310_N$ and forward the data packets to target devices via the Internet 204.

Figure 5:
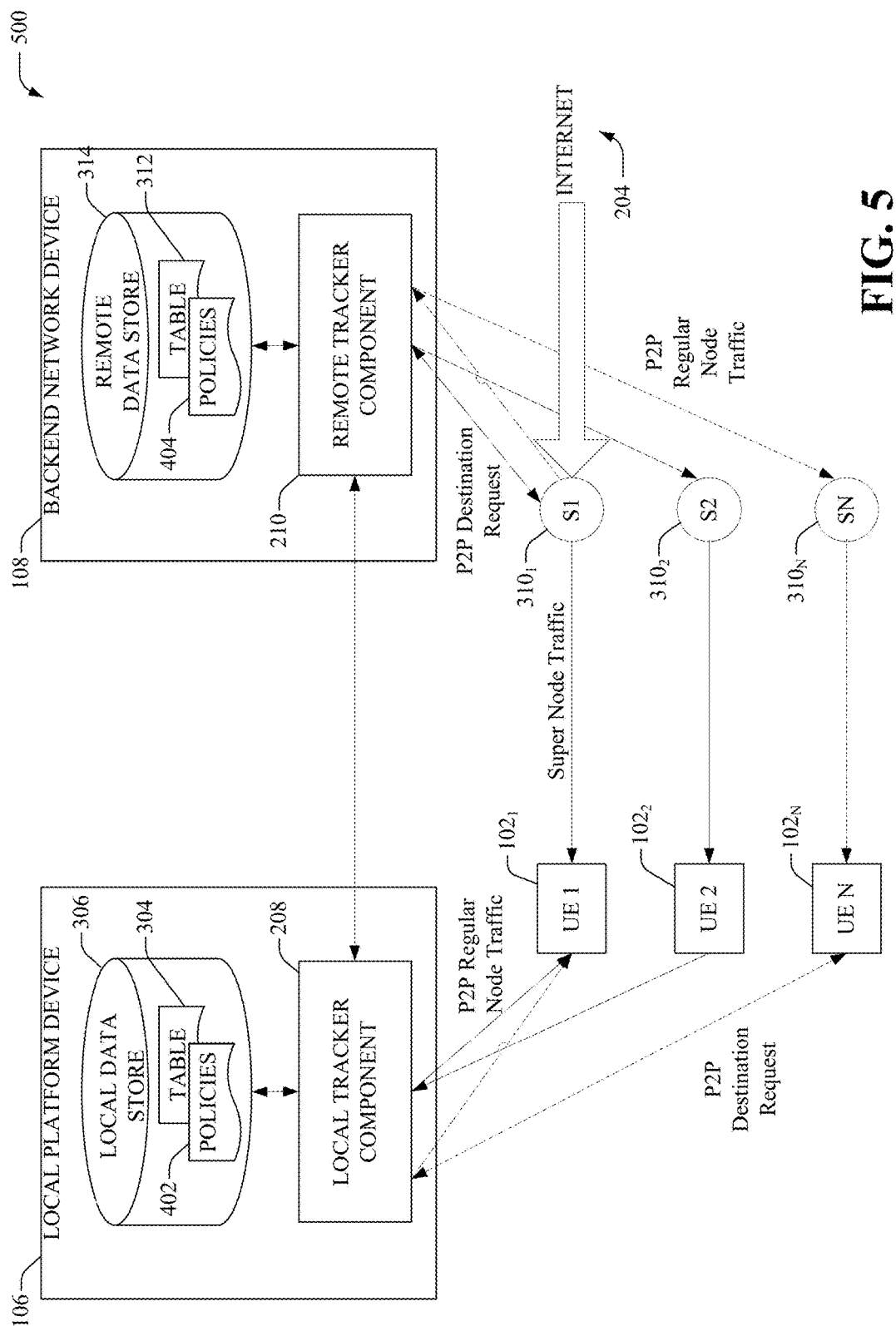
FIG. 5 illustrates an example system that facilitates reception of data at a UE via a P2P overlay network.

Referring now to FIG. 5, there illustrated is an example system 500 that facilitates reception of data at a UE via a P2P overlay network, according to one or more aspects of the disclosed subject matter. Typically, the local platform device 106 can be part of an onboard audio/video system of a vehicle (e.g., a navigation system, a head-up display (HUD), etc.). It can be noted that the UEs $102_1$-$102_N$, local platform device 106, the backend network device 108, local tracker component 208, remote tracker component 210, tables 304 and 312, local data store 306, shadow VMs S1-SN 310₁-310$_N$, remote data store 314, and network/user policies 402 and 404 can include functionality as more fully described herein, for example, as described above with regard to systems 100-400.

According to an aspect, transmission resources (e.g., wireless links 110₂-110$_N$) of peer devices (e.g., UEs 102₂-102$_N$) can be leveraged to transmit communication data (e.g., data packets associated with voice/video calls, text messages, application data, etc.) to a UE (e.g., UEs 102₁). The communication data can be received from source devices via the Internet 204 and most of the communication data can be sent to UE 102₁ through its designated super node S1 310₁ (e.g., via wireless communication link 110₁). S1 310₁ can then transmit a P2P destination request to the remote tracker component 210 for information regarding destination VM(s) through which the remainder of the communication data can be transmitted. As an example, the division of the communication data into portions that are routed via different destination VM(s) can be determined based on predefined network/user policies. Based on data stored in the remote data store 314 (e.g., table 312 and/or network/user policies 404), the remote tracker component 210 can provide S1 310₁ with device identifier information (e.g., IP address) of the destination VM(s), such as but not limited to, S2-S3 310₂-310$_N$. Accordingly, S1 310₁ can transmit the remainder of the communication data to S2 310₂ and/or S3 310$_N$. In one example, S1 310₁ can transmit the remainder of the communication data to S2-S3 310₂-310$_N$ via the remote tracker component 210 (as depicted in FIG. 5). In another example, S1 310₁ can directly transmit the remainder of the communication data to S2-S3 310₂-310$_N$ via P2P links between S1 310₁ and the respective S2-S3 310₂-310$_N$. On receiving the remainder of the communication data, S2-S3 310₂-310$_N$ can forward the communication data to their respective super nodes UEs 102₂-102$_N$, for example, via wireless communication links 110₂-110$_N$.

Based on the routing data, the UEs 102₂-102$_N$ can send a P2P destination request to the local tracker component 208 to request for a destination device. The local tracker component 208 can provide UEs 102₂-102$_N$ data corresponding to the UE (e.g., UE 102₁) associated with the destination of the communication data. Accordingly, UEs 102₂-102$_N$ can send the received data to UE 102₁, for example, via the local tracker component 208 (as depicted in FIG. 5) and/or directly via P2P links between the UEs 102₂-102$_N$ and UE 102₁. In one aspect, UE 102₁ can aggregate and/or assemble the data packets received via S1 310₁ and UEs 102₂-102$_N$, and complete the Internet request.

Figure 6:
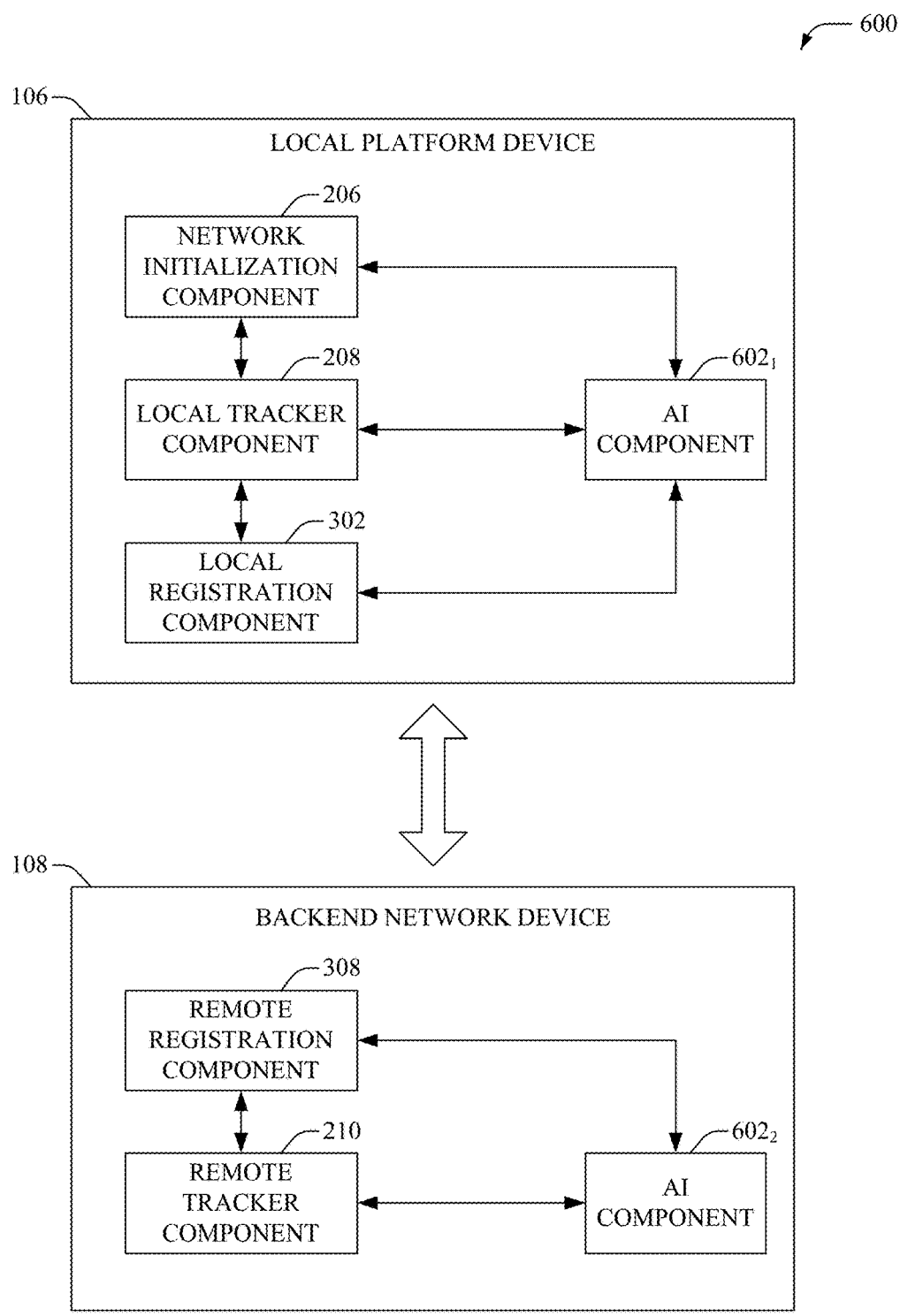
FIG. 6 illustrates an example system that facilitates automating one or more features in accordance with the subject embodiments.

Referring now to FIG. 6, there illustrated is an example system 600 that employs artificial intelligence (AI) components (602₁, 602₂) to facilitate automating one or more features in accordance with the subject embodiments. It can be noted that the local platform device 106, the backend network device 108, network initialization component 206, local tracker component 208, remote tracker component 210, local registration component 302, and remote registration component 308 can include functionality as more fully described herein, for example, as described above with regard to systems 100-500.

In an example embodiment, system 600 (e.g., in connection with automatically initializing a logical P2P network) can employ various AI-based schemes (e.g., intelligent processing/analysis, machine learning, etc.) for carrying out various aspects thereof. For example, a process for determining when to initialize the logical P2P network, how much data is to be transferred via the super node links, how to determine routing of the remaining data, devices to which communication is authorized/denied, etc. can be facilitated via an automatic classifier system implemented by AI components 602₁ and/or 602₂. Moreover, the AI components 602₁ and 602₂ can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI components 602₁ and 602₂ can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Further, advanced AI and mathematical techniques can be employed to analyze the efficiency of each data link (physical and virtual) to determine the proportion of the data that is to be sent through each link to maximize (or increase) data transport efficiency.

As will be readily appreciated from the subject specification, an example embodiment can employ classifiers that are explicitly trained (e.g., via a generic training data) as well as implicitly trained (e.g., via observing vehicle motion, vehicle behavior, user/operator preferences, historical information, receiving extrinsic information, type of vehicle, type of sensors, etc.). For example, SVMs can be configured via a learning or training phase within a classifier constructor and feature selection module. Thus, the classifier(s) of AI components 602₁ and/or 602₂ can be used to automatically learn and perform a number of functions, including but not limited to determining according to a predetermined criteria, a time period to initialize the logical P2P network and set up a remote tracker component 210 in a backend network device 108, a first portion of data that is to be transferred via the super node links and a second portion of data that is to be transferred via destination devices, routing of the second portion of data, devices to which communication is authorized/restricted, etc. The criteria can include, but is not limited to, historical patterns and/or trends, UE behavior, user preferences, service provider preferences and/or policies, location of the local platform device 106, current time/date, and the like.

Figure 7:
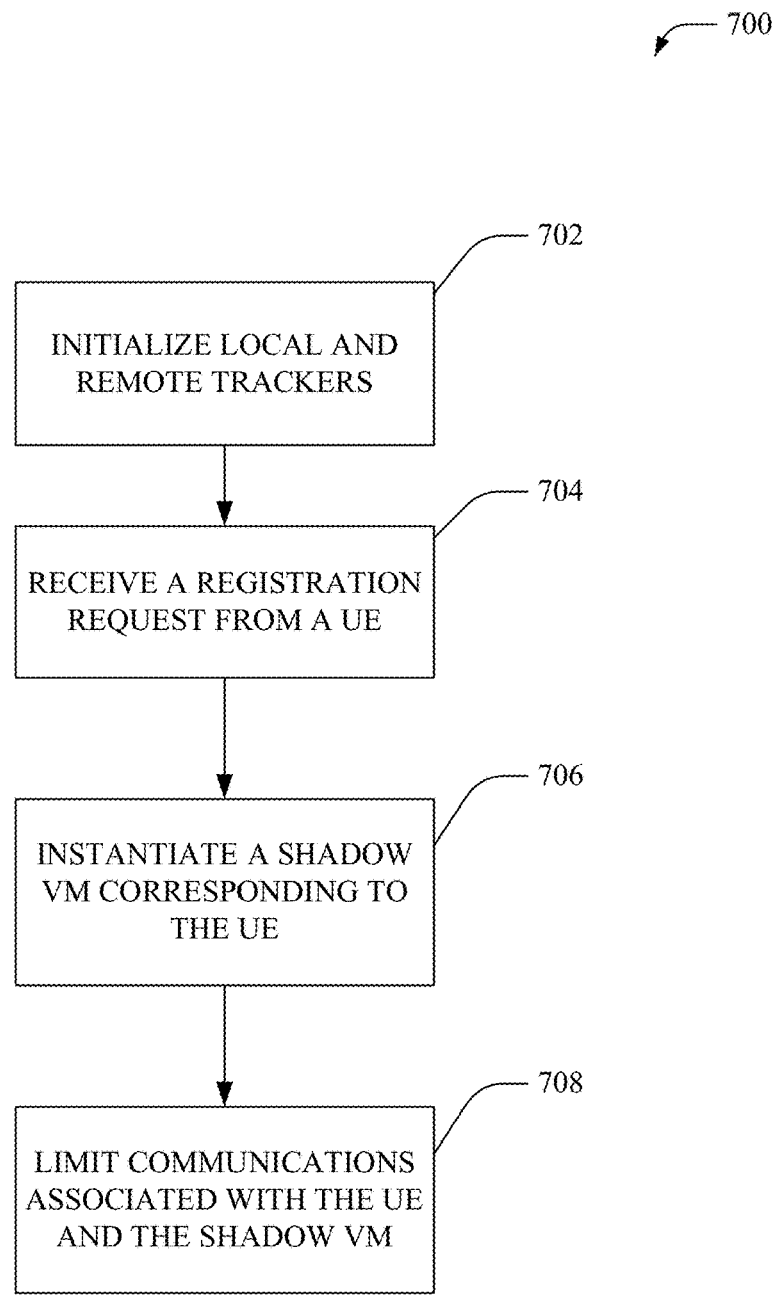
FIG. 7 illustrates an example method that facilitates initialization of a P2P network over a set of heterogeneous communication links.
Figure 8:
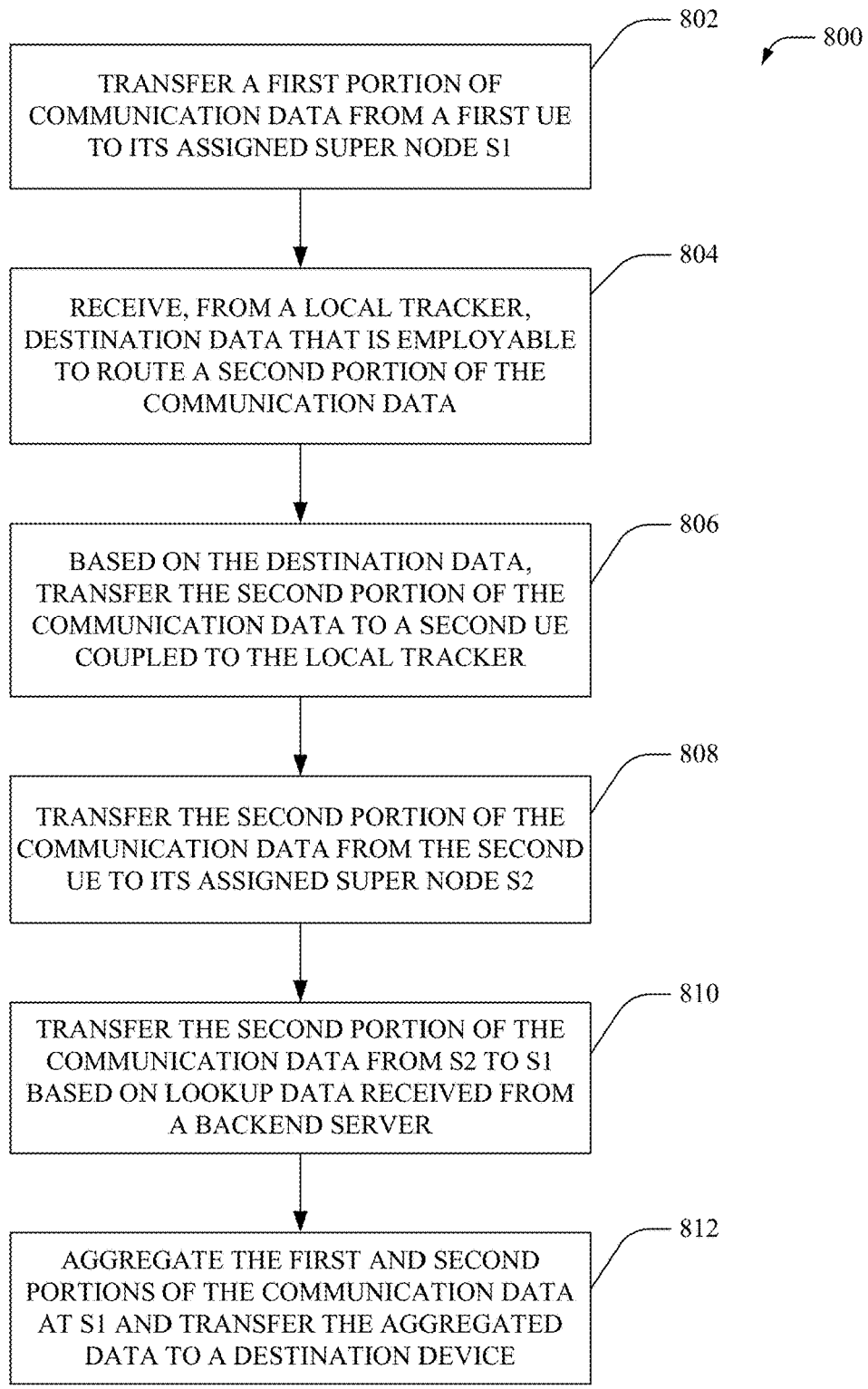
FIG. 8 illustrates an example method that facilitates transmission of communication data from a UE via shared wireless links of a P2P overlay network.
Figure 9:
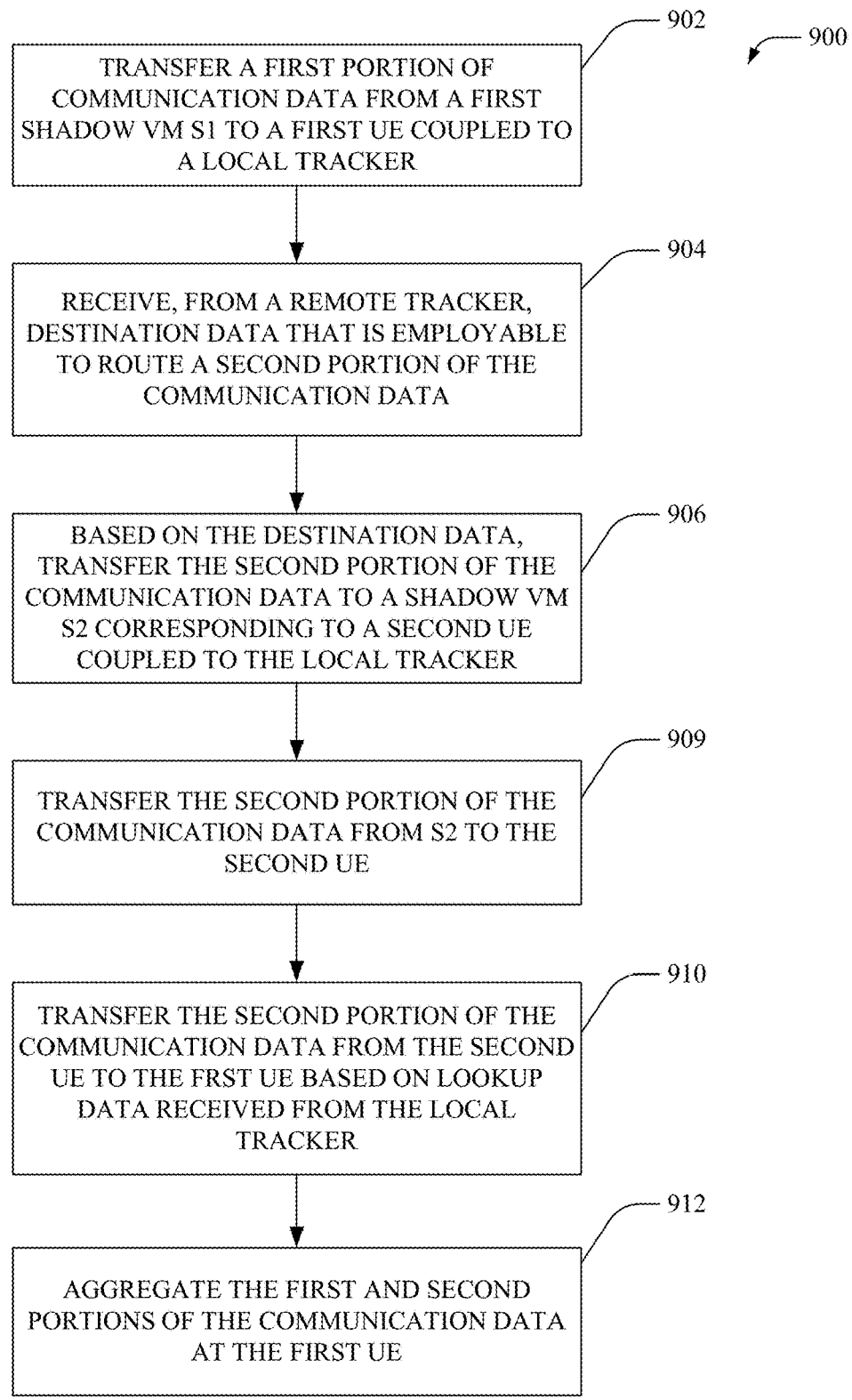
FIG. 9 illustrates an example method that facilitates transmission of communication data to a UE via shared wireless links of a P2P overlay network.

FIGS. 7-9 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 7, illustrated is an example method 700 that facilitates initialization of a logical P2P network over a set of heterogeneous communication links, according to an aspect of the subject disclosure. As an example, method 700 can be implemented by one or more networked devices onboard a vehicle. At 702, local and remote trackers can be initialized. For example, the local tracker can be setup within the vehicle and the remote tracker can be setup within a network device (e.g., of a cellular network). The trackers can be assigned as P2P super nodes to each other. The remote tracker can be employed to host all data requests from devices tracked by the local tracker.

At 704, a registration request can be received by the local tracker from a UE. On receiving the request, the local tracker can communicate with the remote tracker to initiate device registration. At 706, a shadow VM corresponding to the UE can be instantiated, for example, by the remote tracker. As an example, the shadow VM can be instantiated on one or more servers within the cellular network. At 708, communications associated with the UE and the shadow VM can be limited. In one aspect, the UE and the shadow VM can be assigned as each other's super nodes. Further, the UE can be restricted to communicate only with its super node (e.g., the shadow VM) and the local tracker. Furthermore, the shadow VM can be restricted to communicate only with its super node (e.g., the UE) and the remote tracker.

FIG. 8 illustrates an example method 800 that facilitates transmission of communication data from a UE via shared wireless links of a P2P network, according to an aspect of the subject disclosure. As an example, communication data can include data packets associated with a voice call, text message, application data, etc. During initialization of the P2P network, shadow VMs can be created in the network (e.g., cellular network) for UEs that have registered with a local platform device (e.g., within a connected vehicle). Moreover, the shadow VMs and the respective UEs can be designated as each other's super nodes. At 802, a first portion of the communication data can be transferred from a first UE to its assigned super node, for example, a shadow VM S1. As an example, the first portion of the communication data can be transferred via a RAN of a cellular network. At 804, destination data that is employable to route a second portion of the communication data can be received from a local tracker of the local platform device. As an example, the destination data specifies other UEs that are registered with a local platform device, though which the second portion of the communication data can be routed. At 806, the second portion of the communication data can be routed to a second UE, for example, via the local platform device and/or directly via a P2P link. At 808, the second portion of the communication data can be transferred from the second UE to its assigned super node, for example, a shadow VM S2. Further, at 810, the second portion of the communication data can be transferred from S2 to S1, based on lookup data received from a backend server of the cellular network. At 812, the first and second portions of the communication data can be aggregated at S1 and transferred to a destination device, for example, via a wide area network (e.g. Internet).

FIG. 9 illustrates an example method 900 that facilitates transmission of communication data to a UE via shared wireless links of a P2P network, according to an aspect of the subject disclosure. As an example, communication data can include data packets associated with a voice call, text message, application data, etc. During initialization of the logical P2P network, shadow VMs can be created in the network (e.g., cellular network) for UEs that have registered with a local platform device (e.g., within a connected vehicle). Moreover, the shadow VMs and the respective UEs can be designated as each other's super nodes. In one aspect, communication data, directed to a first UE coupled to a local tracker of the local platform device, can be received by a network device (e.g. a first shadow VM S1 corresponding to the first UE), for example, via a wide area network (e.g. Internet). At 902, a first portion of the communication data can be transferred from the first shadow VM to its assigned super node, for example, to the first UE. As an example, the first portion of the communication data can be transferred via a RAN of a cellular network. At 904, destination data that is employable to route a second portion of the communication data can be received from a remote tracker implemented within a backend network device. As an example, the destination data specifies other shadow VMs corresponding to UEs that are registered with a local platform device, though which the second portion of the communication data can be routed. At 906, the second portion of the communication data can be routed to a second shadow VM S2 corresponding to a second UE coupled to the local tracker, for example, via the backend network device and/or directly via a P2P link. At 908, the second portion of the communication data can be transferred from the second shadow VM S2 to its assigned super node, for example, the second UE (e.g., via a cellular RAN). Further, at 910, the second portion of the communication data can be transferred from the second UE to the first UE, based on lookup data received from the local tracker. At 912, the first and second portions of the communication data can be aggregated at the first UE to complete the data transfer.

Figure 10:
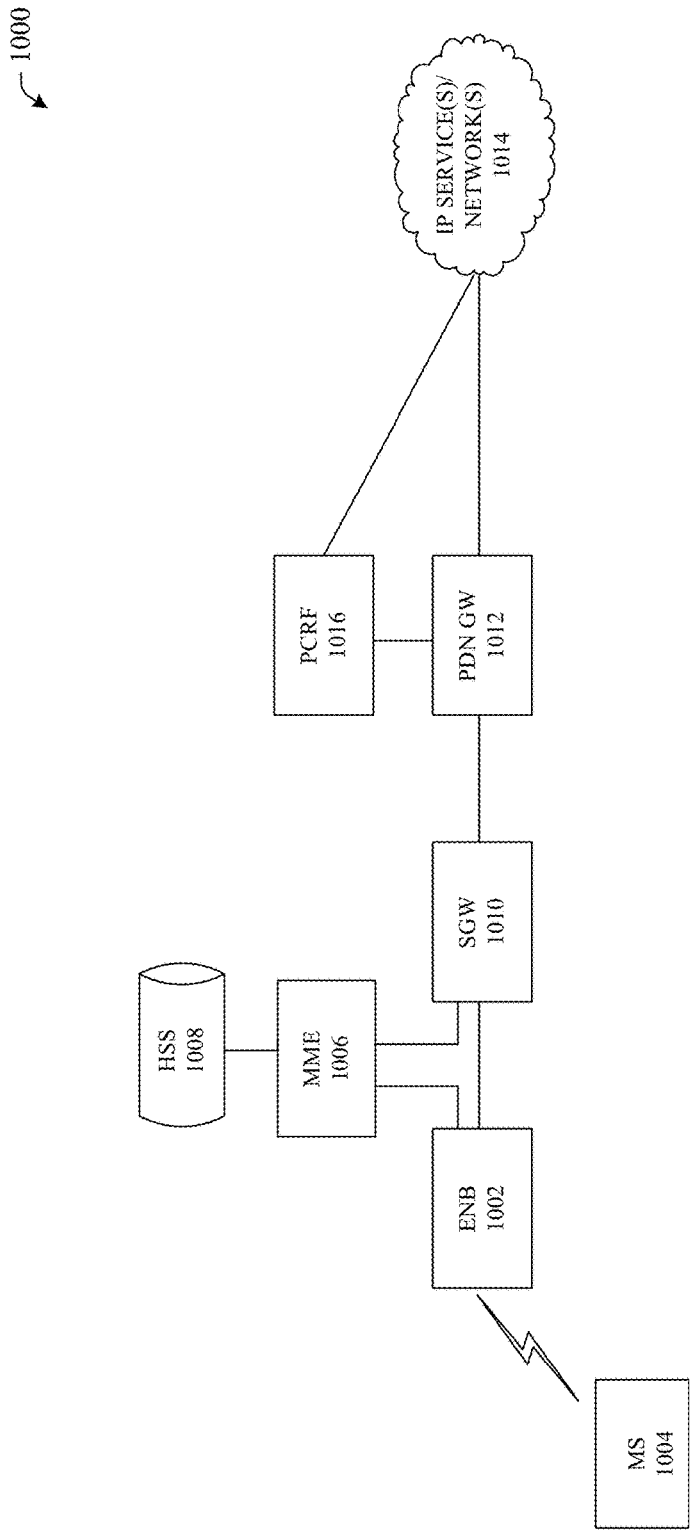
FIG. 10 illustrates a Long Term Evolution (LTE) network architecture that can employ the disclosed architecture.

FIG. 10 illustrates a high-level block diagram that depicts an example LTE network architecture 1000 that can employ the disclosed communication architecture. The evolved RAN for LTE consists of an eNodeB (eNB) 1002 that can facilitate connection of MS 1004 to an evolved packet core (EPC) network. In one aspect, the MS 1104 is physical equipment or Mobile Equipment (ME), such as a mobile phone or a laptop computer that is used by mobile subscribers, with a Subscriber identity Module (SIM). The SIM includes an International Mobile Subscriber Identity (IMSI) and/or MSISDN, which is a unique identifier of a subscriber. The MS 1004 includes an embedded client that receives and processes messages received by the MS 1004. As an example, the embedded client can be implemented in JAVA. It is noted that MS 1004 can be substantially similar to UEs $102_1$-$102_N$, and can include functionality described with respect to UEs $102_1$-$102_N$ in systems 100 and 300-500.

The connection of the MS 1004 to the evolved packet core (EPC) network is subsequent to an authentication, for example, a SIM-based authentication between the MS 1004 and the evolved packet core (EPC) network. In one aspect, the MME 1006 provides authentication of the MS 1004 by interacting with the HSS 1008. The HSS 1008 contains a subscriber profile and keeps track of which core network node is currently handling the subscriber. It also supports subscriber authentication and authorization functions (AAA). In networks with more than one HSS 1008, a subscriber location function provides information on the HSS 1008 that contains the profile of a given subscriber.

As an example, the eNB 1002 can host a PHYsical (PHY), Medium Access Control (MAC), Radio Link Control (RLC), and Packet Data Control Protocol (PDCP) layers that include the functionality of user-plane header-compression and encryption. In addition, the eNB 1002 can implement at least in part Radio Resource Control (RRC) functionality (e.g., radio resource management, admission control, scheduling, cell information broadcast, etc.). The eNB 1002 can be coupled to a serving gateway (SGW) 1010 that facilitates routing of user data packets and serves as a local mobility anchor for data bearers when the MS 1004 moves between eNBs. The SGW 1010 can act as an anchor for mobility between LTE and other 3GPP technologies (GPRS, UMTS, etc.). When MS 1004 is in an idle state, the SGW 1010 terminates a downlink (DL) data path and triggers paging when DL data arrives for the MS 1004. Further, the SGW 1010 can perform various administrative functions in the visited network such as collecting information for charging and lawful interception. In one aspect, the SGW 1010 can be coupled to a Packet Data Network Gateway (PDN GW) 1012 that provides connectivity between the MS 1004 and external packet data networks such as IP service(s)/network(s) 1014. Moreover, the PDN GW 1012 is a point of exit and entry of traffic for the MS 1004. It is noted that the MS 1004 can have simultaneous connectivity with more than one PDN GW (not shown) for accessing multiple PDNs.

The PDN GW 1012 performs IP address allocation for the MS 1004, as well as QoS enforcement and implements flow-based charging according to rules from a Policy Control and Charging Rules Function (PCRF) 1016. The PCRF 1016 can facilitate policy control decision-making and control flow-based charging functionalities in a Policy Control Enforcement Function (PCEF), which resides in the PDN GW 1012. The PCRF 1016 can store data (e.g., QoS class identifier and/or bit rates) that facilitates QoS authorization of data flows within the PCEF. In one aspect, the PDN GW 1012 can facilitate filtering of downlink user IP packets into the different QoS-based bearers and perform policy enforcement, packet filtering for each user, charging support, lawful interception and packet screening. Further, the PDN GW acts as the anchor for mobility between 3GPP and non-3GPP technologies such as WiMAX and 3GPP2 (CDMA 1× and EvDO). Although an LTE network architecture 1000 is described and illustrated herein, it is noted that most any communication network architecture can be utilized to implement the disclosed embodiments.

Figure 11:
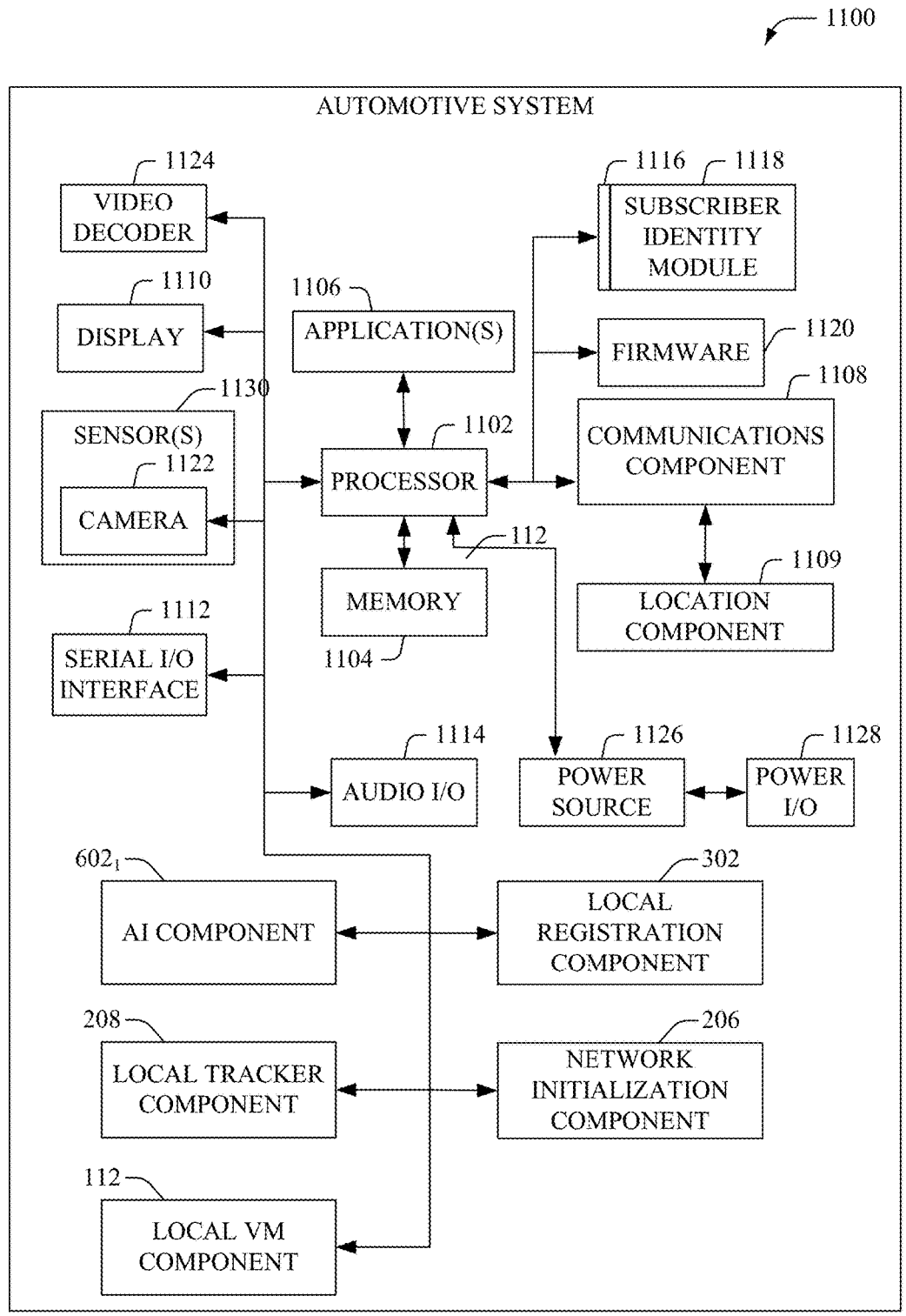
FIG. 11 an example block diagram of an automotive system utilized by connected cars to facilitate aggregation of data links.

Referring now to FIG. 11, there is illustrated a block diagram of an automotive system 1100 utilized by connected cars to facilitate aggregation and/or sharing of data links associated with devices coupled to the connected car in accordance with the subject specification. Moreover, the local platform device 106 can include at least a portion of the automotive system 1100. In one aspect, the automotive system 1100 can include a processor 1102 for controlling all onboard operations and processes. A memory 1104 can interface to the processor 1102 for storage of data (e.g., including local data store 306) and one or more applications 1106 being executed by the processor 1102. A communications component 1108 can interface to the processor 1102 to facilitate wired/wireless communication with external systems (e.g., other vehicles, access points, network servers, etc.). The communications component 1108 can interface to a location component 1109 (e.g., GPS transceiver) that can facilitate location detection of the automotive system 1100.

The automotive system 1100 can include a display 1110 for displaying received content (and/or content to be transferred) and/or for displaying text information related to operating and using the device features. In one example, the display can include a heads-up display (HUD). A serial I/O interface 1112 is provided in communication with the processor 1102 to facilitate serial communication (e.g., USB, and/or IEEE 1194) via a hardwire connection. Audio capabilities are provided with an audio I/O component 1114, which can include a speaker for the output of audio signals related to, for example, recorded data or telephony voice data, and a microphone for inputting voice commands.

Additionally or optionally, the automotive system 1100 can include a slot interface 1116 for accommodating a subscriber identity module (SIM) 1118. Firmware 1120 is also provided to store and provide to the processor 1102 startup and operational data. The automotive system 1100 can also include sensors 1130 comprising a camera 1122 and/or a video decoder 1124 for decoding encoded multimedia content. Further, the automotive system 1100 can include a power source 1126 in the form of batteries, which power source 1126 can interface to an external power system or charging equipment via a power I/O component 1128. In addition, the automotive system 1100 can include the local VM component 112, network initialization component 206, local tracker component 208, local registration component 302, and the AI component 602$_1$, which can be stored in memory 1104 and/or implemented by an application 1106, can include respective functionality, as more fully described herein, for example, with regard to systems 100-600.

Figure 12:
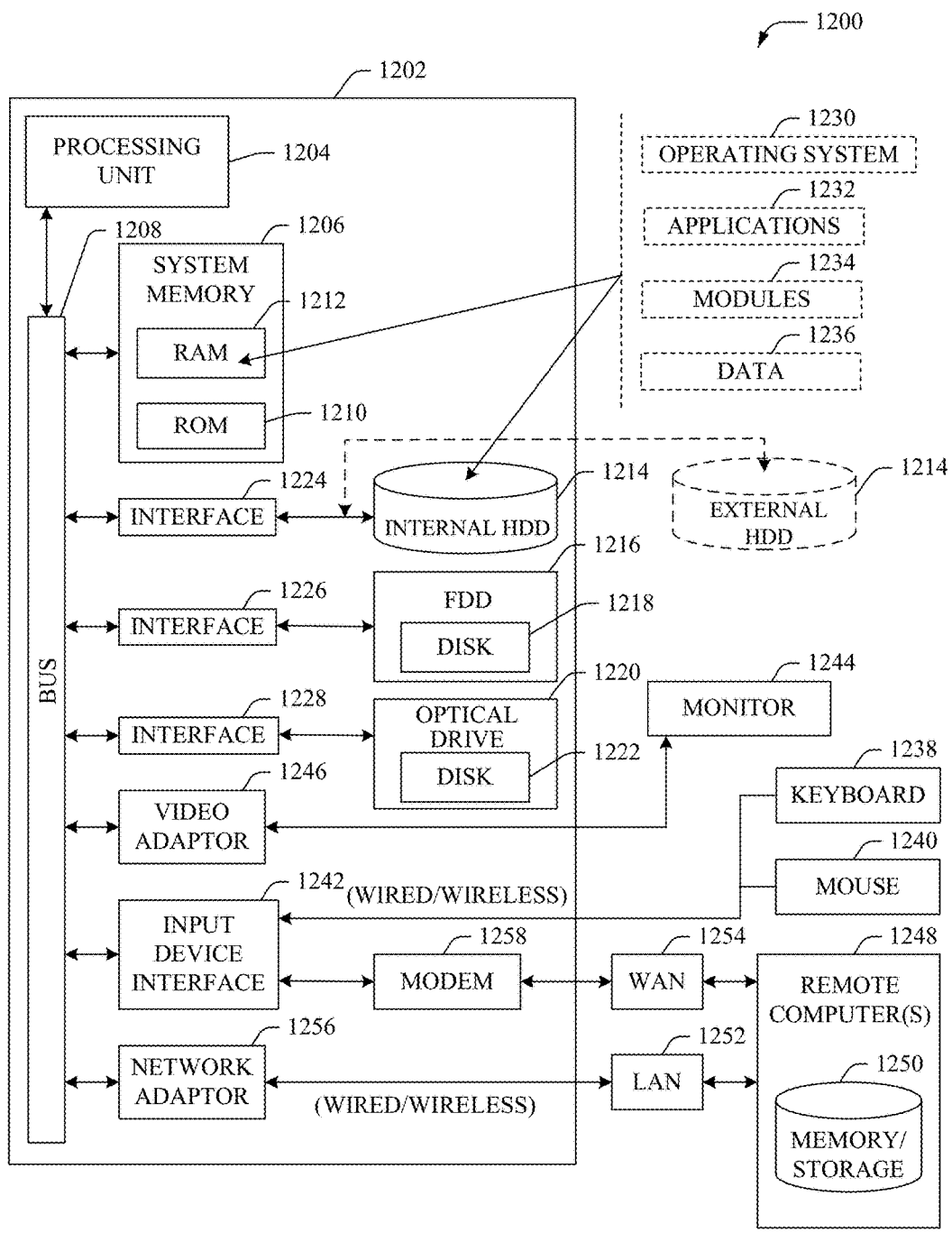
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the component(s), server(s), equipment, system(s), interface(s), vehicle(s), and/or device(s) (e.g., UEs $102_1$-$102_N$, local platform device 106, the backend network device 108, local VM component 112, remote VM component 114, network initialization component 206, local tracker component 208, remote tracker component 210, local registration component 302, remote registration component 308, shadow VMs S1-SN $310_1$-$310_N$, and AI components $602_1$-$602_2$, etc.) disclosed herein with respect to systems 100-600 and 1000-1100 can each include at least a portion of the computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least WiFi and Bluetooth™ wireless technologies or other communication technologies. Thus, the communication can be a predefined structure as with a conventional network or simply an ad hoc communication between at least two devices.

WiFi, or Wireless Fidelity networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Referring now to FIG. 13, there is illustrated a schematic block diagram of a computing environment 1300 in accordance with the subject specification. The system 1300 includes one or more client(s) 1302. The client(s) 1302 can be hardware and/or software (e.g., threads, processes, computing devices).

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:

based on information stored within a subscriber identity module of a tracker device of a vehicle, facilitating an authentication of the tracker device to allow a communication between the tracker device and a network device of a cellular network;

subsequent to the authentication and in response to determining that user equipment are located within the vehicle, facilitating an establishment of respective virtual nodes corresponding to the user equipment via the communication between the tracker device and the network device, and in response to determining that data packets are to be transferred from a first user equipment of the user equipment to a destination device of a wide area network that is coupled to network device, facilitating a first transmission of a first portion of the data packets from the first user equipment directly to a first virtual node of the respective virtual nodes via a first wireless link of the first user equipment by employing a peer-to-peer protocol, and providing, to the first user equipment, device identification data indicative of a second user equipment of the user equipment to facilitate a transfer of a second portion of the data packets from the first user equipment to the second user equipment and subsequent to the transfer, facilitate a second transmission of the second portion of the data from the second user equipment to a second virtual node of the respective virtual nodes by employing the peer-to-peer protocol, wherein the first user equipment is restricted to communicate with the destination device via the first virtual node and the second user equipment is restricted to communicate with the destination device via the second virtual node.

2. The system of claim 1, wherein the peer-to-peer protocol is overlaid on an application layer of the user equipment.

3. The system of claim 1, wherein the second portion of the data packets is directed from the second virtual node to the first virtual node via peer-to-peer protocol communication links and the data packets are directed from the first virtual node to the wide area network device.

4. The system of claim 1, wherein the operations further comprise:
receiving, from the first user equipment report data indicative of an availability of resources associated with the user equipment.

5. The system of claim 4, wherein the report data comprises information that represents respective bandwidth available to the user equipment.

6. The system of claim 4, wherein the report data comprises channel quality data associated with the user equipment.

7. The system of claim 4, wherein the resource comprises signal strength data associated with the user equipment.

8. The system of claim 4, wherein the operations further comprise:
analyzing the report data; and
based on a result of the analyzing, determining routing information that represents a route for the transfer of the second portion of the data.

9. The system of claim 8, wherein the operations further comprise:
storing address data associated with the user equipment; and
in response to determining that the first user equipment has deregistered from the tracker device, deleting a portion of the address data associated with the first user equipment.

10. The system of claim 1, wherein the second portion of the data packets is directed from the first user equipment to the second user equipment via a peer-to-peer protocol communication link.

11. The system of claim 1, wherein the first user equipment is a device embedded within the vehicle.

12. A method, comprising:
utilizing, by a tracker device comprising a processor, information stored within a subscriber identity module of the tracker device to perform an authentication of the tracker device that allows communication between the tracker device and a network device of a cellular network, wherein the tracker device is coupled to a vehicle;

facilitating, by the tracker device, an instantiation of respective virtual nodes corresponding to user equipment that are determined to be located within the vehicle, wherein the facilitating comprises instructing the network device to instantiate the respective virtual nodes;

in response to receiving request data from a first user equipment of the user equipment, directing, by the tracker device, destination data to the first user equipment, wherein the request data is indicative of a request to transfer communication data from the first user equipment to a wide area network device coupled to the network device, and wherein the destination data is indicative of a second user equipment of the user equipment; and facilitating, by the tracker device, the transfer of the communication data based on a first transmission of first portion of the communication data from the first user equipment directly to a first virtual node of the respective virtual nodes via a first wireless link of the first user equipment and subsequent to communication of a second portion of the communication data from the first user equipment to the second user equipment via the tracker device, a second transmission of the second portion of the communication data from the second user equipment to the wide area network device via a second wireless link between the second user equipment and a second virtual node of the respective virtual nodes that corresponds to the second user equipment, wherein the second transmission adheres to a peer-to-peer protocol, and wherein the first user equipment is restricted to communicate with the wide area network device via the first virtual node and the second user equipment is restricted to communicate with the wide area network device via the second virtual node.

13. The method of claim 12, wherein the facilitating the transfer of the communication data comprises directing the second portion of communication data to the wide area network device via a third transmission of the second portion of the communication data from the second virtual node to the first virtual node.

14. The method of claim 12, further comprising:
facilitating, by the tracker device, the first transmission of the first portion of the communication data to the first virtual node by employing the peer-to-peer protocol.

15. The method of claim 14, further comprising:
prohibiting, by the tracker device, the first user equipment to communicate with devices other than the first virtual node and the tracker device.

16. The method of claim 12, wherein the directing the destination data comprises directing address data indicative of an internet protocol address associated with the second user equipment.

17. A non-transitory machine-readable storage medium comprising executable instructions that, when executed by a processor of a first user equipment located within a vehicle, facilitate performance of operations, comprising:

directing, to a tracker device within the vehicle, request data to facilitate a registration of the first user equipment with the tracker device, wherein a first virtual node corresponding to the first user equipment is instantiated via a network device of a cellular network during the registration and subsequent to an authentication of the tracker device that allows the tracker device to access network devices, comprising the network device, of the cellular network, and wherein the authentication is based on information stored within a subscriber identity module of the tracker device; and in response to determining that data packets are to be directed from the first user equipment to a wide area network device of a wide area network that is coupled to the cellular network, facilitating a first transmission of a first portion of the data packets from the first user equipment directly to the first virtual node via a first wireless link that supports a peer-to-peer protocol;

receiving, from the tracker device, device identification data indicative of a second user equipment that is determined to be located within the vehicle; and based on the device identification data, facilitating a second transmission of a second portion of the data packets between the first user equipment and the first virtual node via a second wireless link between the second user equipment and a second virtual node corresponding to the second user equipment that has been instantiated via the network device, wherein the second wireless link supports the peer-to-peer protocol, and wherein the first user equipment is restricted to communicate with the wide area network device via the first virtual node and the second user equipment is restricted to communicate with the wide area network device via the second virtual node.

18. The non-transitory machine-readable storage medium of claim 17, wherein the peer-to-peer protocol comprises a logical peer-to-peer network across a receiving end and a transmitting end of an application layer.

19. The non-transitory machine-readable storage medium of claim 17, wherein the data packets comprise first data packets and the operations further comprise:

receiving a first group of second data packets from the first virtual node via the first wireless link of the first user equipment by employing the peer-to-peer protocol;

receiving a second group of the second data packets from the tracker device, wherein the second group of the second data packets are received via the second wireless link; and aggregating the first group of the second data packets with the second group of the second data packets.

20. The non-transitory machine-readable storage medium of claim 17, wherein the facilitating the second transmission comprises facilitating the second transmission in response to determining that a data-transfer characteristic associated with the first user equipment do not satisfy a defined criterion operations.

* * * * *